United States Patent [19]

Suzuki

[11] Patent Number: 4,491,883
[45] Date of Patent: Jan. 1, 1985

[54] PULLEY CAM FOR A TAPE CASSETTE DRIVE WHICH MOVES AXIALLY OF THE DRIVING GEAR

[75] Inventor: Nobuo Suzuki, Kanagawa, Japan

[73] Assignee: Technical Incorporated, Japan

[21] Appl. No.: 379,564

[22] Filed: May 18, 1982

[30] Foreign Application Priority Data

| May 23, 1981 | [JP] | Japan | 56-79049 |
| May 23, 1981 | [JP] | Japan | 56-79050 |
| May 23, 1981 | [JP] | Japan | 56-79051 |

[51] Int. Cl.³ ............................................. G11B 15/22
[52] U.S. Cl. .................................. 360/74.2; 242/186; 242/191
[58] Field of Search .............. 242/186, 191; 360/74.2, 360/74.1

[56] References Cited

U.S. PATENT DOCUMENTS

| 3,759,463 | 9/1973 | Yoshii | 242/186 |
| 3,976,263 | 8/1976 | Suzuki | 242/201 |
| 4,089,487 | 5/1978 | Ichikawa et al. | 242/186 |

FOREIGN PATENT DOCUMENTS 55-38614  3/1980  Japan .................................. 242/186

*Primary Examiner*—George G. Stellar
*Attorney, Agent, or Firm*—Hill, Van Santen, Steadman & Simpson

[57] ABSTRACT

A cassette tape recorder in which a fully automatic shut-off of the tape drive occurs whenever stopping of a winding reel shaft or a tape feed reel shaft is sensed and which is utilized to transmit through associated mechanism to shut-off the operation of the tape recorder. A felt disk which is mounted in a suitable lubricant and placed between a spring loaded means and a reel shaft operates in combination with sensing mechanism to effect shut-off of the tape recorder.

5 Claims, 17 Drawing Figures

PULLEY CAM FOR A TAPE CASSETTE DRIVE WHICH MOVES AXIALLY OF THE DRIVING GEAR

BACKGROUND OF THE INVENTION

1. Field of the Invention

This invention relates in general to a cassette tape recorder particularly of the type controlled by a plurality of manual operating buttons and relates in particular to an automatic shut-off mechanism.

2. Description of the Prior Art

Automatic shut-off means of the tape in cassette tape recorders are known and one such means utilizes the tape tension so that when the tape reaches the end of the reel the tension will cause the mechanism to turn off. Such structure is disclosed in Japanese Patent Publication No. 48(1973)-13046, Japanese Patent Disclosure Gazette No. 48(1973)-50707 and Japanese Utility Model Disclosure Gazette No. 48(1973)-4321. With such tape tension devices, the tape is liable to be damaged by friction or to be worn by further tension which is applied to the tape when it stops running. Also, the tape can be broken if the tension is too great. Another prior art system of automatic cut-off is to utilize the oscillating movement of the hub of the cassette tape and such system is disclosed in Japanese Patent Disclosure Gazette No. 51 (1976)-122412. This system utilizes and assures fully automatic shut-off of the tape in tape recorders such as manufactured by leading tape recorder companies and meets the Japanese Industrial Standard (JIS). However, if the cassette tape being used is of low quality, for example, is out of tolerance in dimensions or is slightly skewed or warped, this system does not properly effect fully automatic shut-off of tape running even when the tape recorder itself meets the JIS requirements.

SUMMARY OF THE INVENTION

The present invention eliminates the above listed drawbacks of the conventional systems and comprises a system wherein stopping of either the winding reel shaft or the tape feed reel shaft is sensed and results through associated mechanisms to fully shut-off the operation of the tape recorder.

The invention provides the advantages of not only preventing the tape from being damaged during the shut-off operation but also assures fully automatic shut-off even with low quality cassette tape which is not accurate in dimensions.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
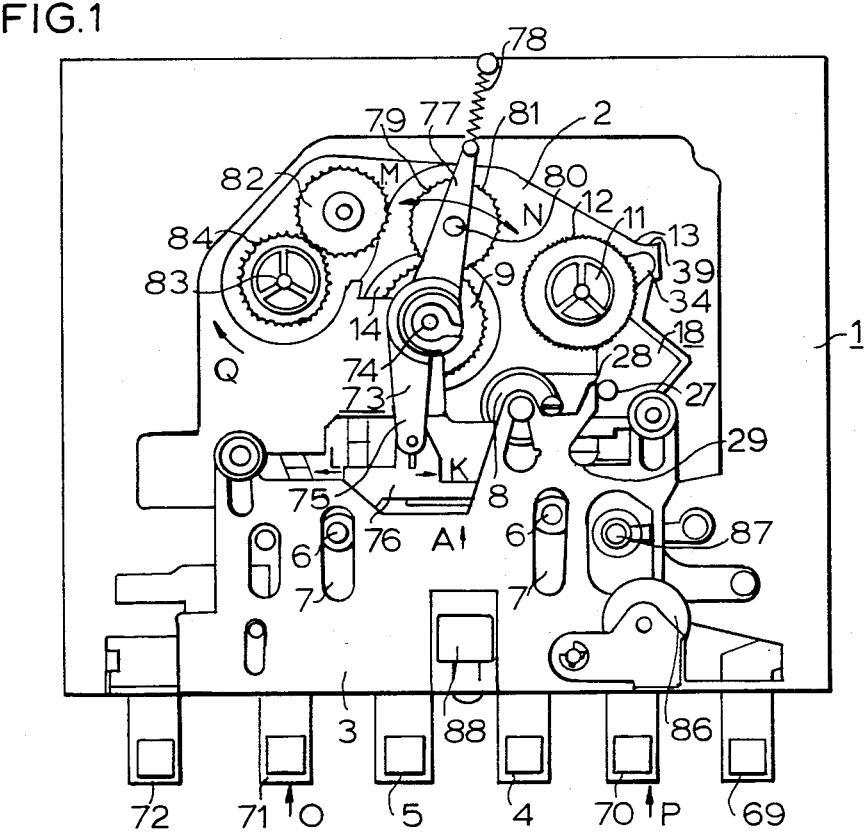
FIG. 1 is a plan view illustrating the essential parts of the cassette tape recorder incorporating the system of the invention.

As illustrated in FIG. 1, a base plate 1 carries a parts assembly 2 and a sliding plate 3 which is adapted to move in the direction of arrow A by operation of a play key 4 or a record key 5. A guide pin 6 is loosely fitted into a guide hole 7 of the sliding plate 3 so that the sliding movement of the sliding plate 3 will be under the control of the guide pin 6.

The sliding plate 3 is locked in a position where it has been moved by sliding in the direction of arrow A by a known locking mechanism and the sliding plate 3 will remain there until the locking mechanism has been released.

An idler 8 is mounted on a portion of the sliding plate 3 and is adapted to be inserted between a friction transmission cylinder boss 10 of a driving gear 9 and a knurled portion 13 formed on a collar 12 of a winding reel shaft 11.

The driving gear 9 is rotated together with a pulley cam 14 which will be later described and rotation of the driving gear 9 is transmitted to the winding reel shaft 11 through the idler so as to rotate the winding reel shaft in a given direction.

The driving gear 9 has a tooth portion 15 and the winding reel shaft 11 has a gear portion 16 formed with teeth 17 around its periphery. (See FIG. 2).

Figure 5:
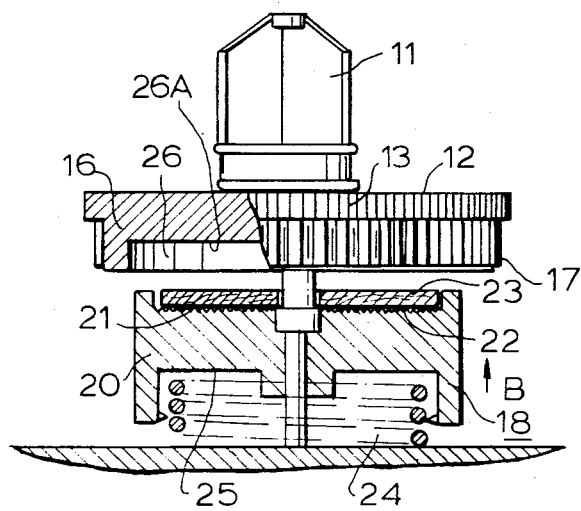
FIG. 5 is a vertical sectional view showing the connecting relationship between the winding reel shaft, the felt ring and the sensing arm.

A sensing arm 18 forms a part of a sensing mechanism 19 so as to sense stopping of rotation of the winding reel shaft 11 and the sensing arm 18 includes a base 20 as shown in FIG. 5 which has an upper recess 21 with circular knurling 22 formed thereon. A felt ring 23 comprises one of the parts of the sensing mechanism 19 and is mounted in the upper recess 21 and the felt ring may be immersed in a kind of oil having appropriate viscosity as, for example, silicon oil, or viscous aqueous solution which may be used instead of silicon oil. A coil spring 24 is mounted in a lower recess 25 of the base 20 and due to the effect of the resilient force of coil spring 24, the sensing arm 18 is urged to move in the direction of arrow B and the felt ring 24 which is immersed in the silicon oil is maintained with light pressure contact with a recess 26 in the gear portion 16 of the winding reel shaft 11 as illustrated in FIG. 5, for example.

During operation of the play key 4 or the record key 5, the felt ring 23 will be urged to make pressure contact in the recess 26 of the gear portion 16 of the winding reel shaft 11 by the sensing arm 18 due to the resilient force of the coil spring 24 in the direction of the arrow B so as to cause the felt ring 23 and the sensing arm 18 to turn in the same direction and to turn together with rotation of the winding reel shaft which is being rotated in a given direction.

Figure 2:
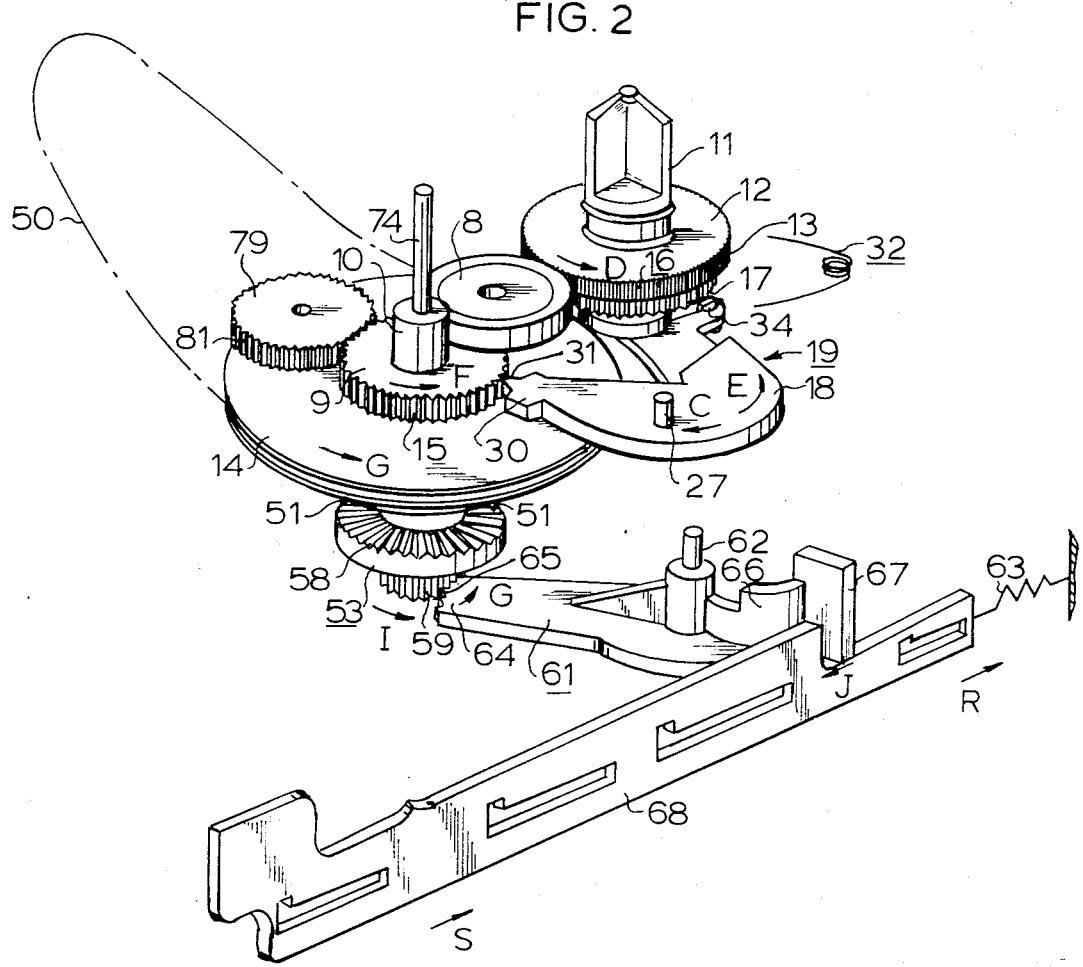
FIG. 2 is a perspective view of the invention.

A stopper 27 shown in FIG. 2 projects from a portion of the sensing arm 18. When the sliding plate 3 is in neutral position, such as when it has not been moved in the direction of the arrow A illustrated in FIG. 1, the stopper 27 will be in pressure contact with a stop portion 28 shown in FIG. 1 at the forward end of the sliding plate 3 to thereby restrain the sensing arm 18 from making turning movement in the direction of the arrow C.

Figure 3:
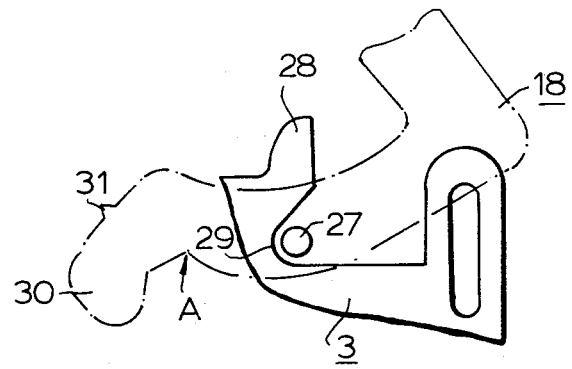
FIG. 3 is an enlarged detail view illustrating the relationship between the sliding plate and the sensing arm.

On the other hand, when the sliding plate 3 has been moved in the direction of the arrow A, the stopper 27 of the sensing arm 18 will not be in pressure contact with a recess stop portion 29 of the sliding plate 3, but will be located near the stop portion 29 as illustrated in FIG. 3, for example.

Figure 4:
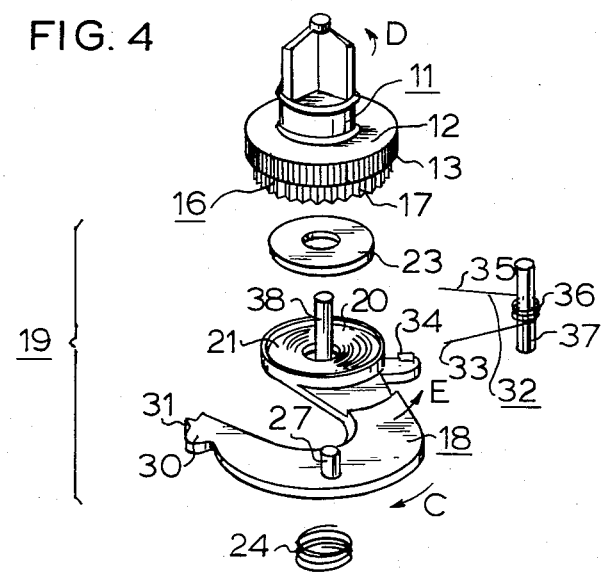
FIG. 4 is an exploded perspective view illustrating the relationship between the winding reel shaft, the felt ring and the sensing arm.
Figure 6:
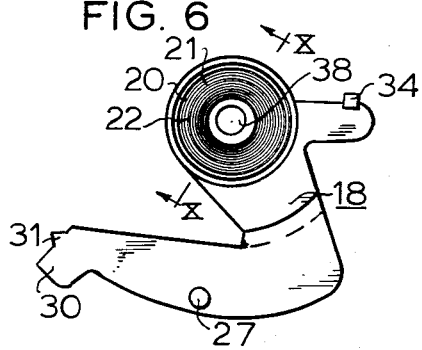
FIG. 6 is a plan view of the sensing arm.
Figure 7:
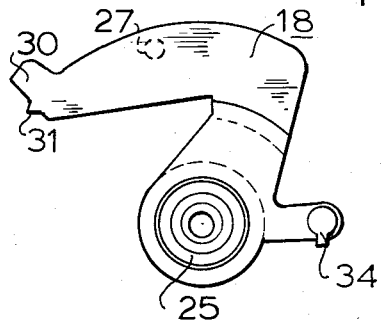
FIG. 7 is a bottom view of the sensing arm.
Figure 9:
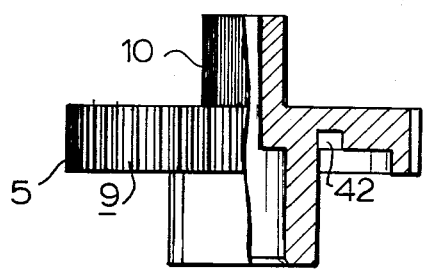
FIG. 9 is an elevational view of the sectional part of the driving gear.

During this condition, a pawl 31 which is provided at the forward end 30 of the sensing arm 18 will not have yet engaged the gear teeth 15 of the driving gear 9 but will be located near the rotating path of the gear tooth 15. A spring 32 shown in FIG. 4 has its coil portion 36 loosely fitted to a shaft 37. One end 33 of the spring 32 is in pressure contact with a locking portion 34 of the sensing arm 18 and the other end 35 is in pressure contact with another stationary portion and the spring 32 will be biased to turn the sensing arm 18 about its shaft 38 in the direction of arrow C. In other words, the spring 32 is biased in a direction opposite to the rotating direction of the winding reel shaft 11 or in a direction of arrow D. However, the biasing force of the spring 32 is so weak that it does not prevent the rotation of the winding reel shaft 11 in the direction of arrow D shown in FIG. 4. When the rotation of the winding reel shaft 11 stops, the biasing force of the spring 32 is effected so as to cause the sensing arm 18 to turn about the shaft 38 in the direction of arrow C so that the pawl 31 of the forward end 30 engages the teeth 17 of the driving gear 9 as shown in FIG. 2. The locking portion 34 has a further function which is to make pressure contact with a stop shoulder 39 shown in FIG. 1 of the parts assembly 2 so as to stop the turning movement of the sensing arm in the direction of arrow E.

The function of the silicon oil immersion felt ring 23 is as a brake means. When the winding reel shaft 11 is rotated in the direction of arrow D shown in FIG. 2, the felt ring 23 and the sensing arm 18 are urged to make pressure contact with the winding reel shaft 11 due to the resilient force of the coil spring 23 which is in the direction of arrow B shown in FIG. 5 and the three parts comprising the winding reel shaft 11, the felt ring 23 and the sensing arm 18 will all turn together and in the same direction. All of these three members will turn in the direction of arrow E shown in FIG. 2, but when the locking portion 34 of the sensing arm 18 engages the stop shoulder 39, the sensing arm 18 and the felt ring will be caused to stop turning.

At the same time, the viscosity of the silicon oil on the felt ring 23 produces sliding friction between the felt ring 23 and contact surface 26a in the recess 26 shown in FIG. 5 of the winding reel shaft 11 so as to permit continuous rotation of the winding reel shaft 11 in the direction of the arrow D shown in FIG. 2 so as to take up the tape. During this time, the felt ring 23 and the sensing arm 18 tend to turn in the direction of arrow E due to the bias force of the spring which is toward the direction of arrow C.

When the winding reel shaft 11 is forced to stop rotation, due to completion of winding the cassette tape, the biasing force of the spring 32 becomes effective to turn the sensing arm 18 toward the arrow C shown in FIG. 2 and sliding friction occurs between the felt ring 23 and the contact surface 26a of the recess 26 in the winding reel shaft 11. Thus, the sensing arm 18 turns toward the arrow C to cause the pawl 31 at its forward end 30 to engage the gear teeth 15 of the driving gear 9 and thus the rotation of the driving gear 9 in the direction of arrow F shown in FIG. 2 will cease.

The immersion of the felt ring 13 in oil provides sliding friction and allows the smooth movement of the sensing arm described above.

Figure 10:
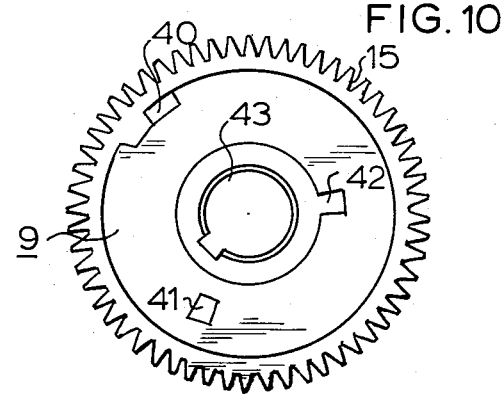
FIG. 10 is a bottom view of the driving gear.
Figure 11:
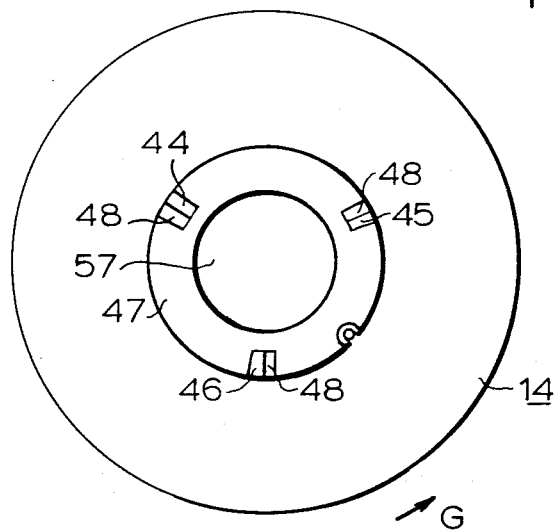
FIG. 11 is a plan view of the pulley cam.
Figure 12:
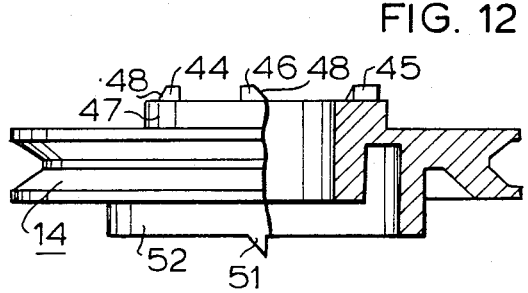
FIG. 12 is an elevational view of the sectional portion of the pulley cam.
Figure 13:
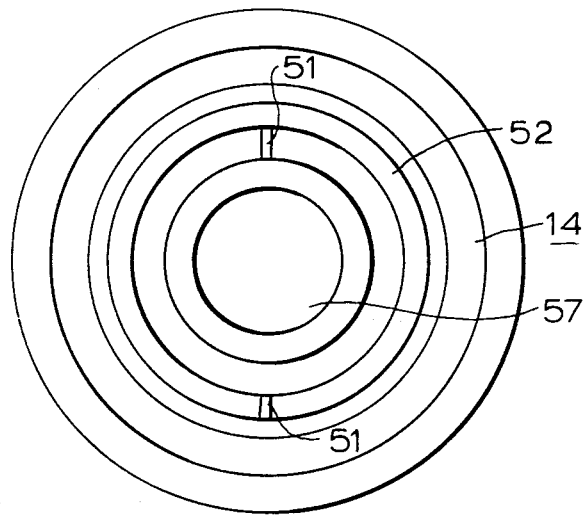
FIG. 13 is a bottom view of the pulley cam.
Figure 14:
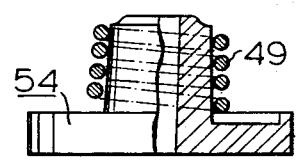
FIG. 14 is an elevational view of the sectional portion of the stopper.

As illustrated in FIG. 10, concave recesses 40, 41 and 42 are provided in the driving gear 9 and these recesses open at an angle of 120° radially with respect to a central shaft 43 and the directions of the radial openings of the three recesses are different from each other as illustrated in FIG. 10. Projections 44, 45 and 46 are provided on a boss 47 of the pulley cam 14 as illustrated in FIG. 11 and the projections 44, 45 and 46 are located radially at angles of 120° with respect to the central shaft 43 and the radial directions of the three projections are different from each other as illustrated in FIG. 11. The projection 44 is associated with a recess 40 of the driving gear 9 for engagement and disengagement. The projection 45 is associated with the recess 40 of the driving gear 9 and the projection 46 is associated with the recess 42 of the driving gear 9.

The projections 44, 45 and 46 are so arranged to form a downwardly directed slope 48 toward the rotating direction of the pulley cam 14 in the direction of arrow G so as to allow the pulley cam 14 to be disengaged from the driving gear 9 when the gear 9 stops rotating and to thereby cause the cam 14 to be free so that it can turn.

In other words, the projections 44, 45 and 46 of the pulley cam 14 are inserted into the recesses 40, 41 and 42 of the driving gear 9 to render the pulley cam 14 and the driving gear 9 locked together so they rotate in the same direction and when the driving gear 9 is prevented from making further rotations due to its engagement with the pawl 31 of the sensing arm 18, then the pulley cam 14 continues to rotate in the direction of arrow G shown in FIG. 11. Then the rotating force of pulley cam 14 depressed itself downwardly in the direction of arrow H shown in FIG. 8 against the effect of the coil spring 49 to facilitate disengagement of the sloping portion 48 of the projections 44, 45 and 46 from the recesses 40, 41 and 42 of the driving gear 9 which results in turning the pulley cam 14 in the direction of the arrow G.

As shown in FIG. 2, a driving belt 50 which can be driven by a suitable motor can drive the pulley cam 14 in the direction of arrow G. A pawl 51 in a lower boss 52 of the pulley cam 14 is adapted to engine a sensing gear 53.

Figure 8:
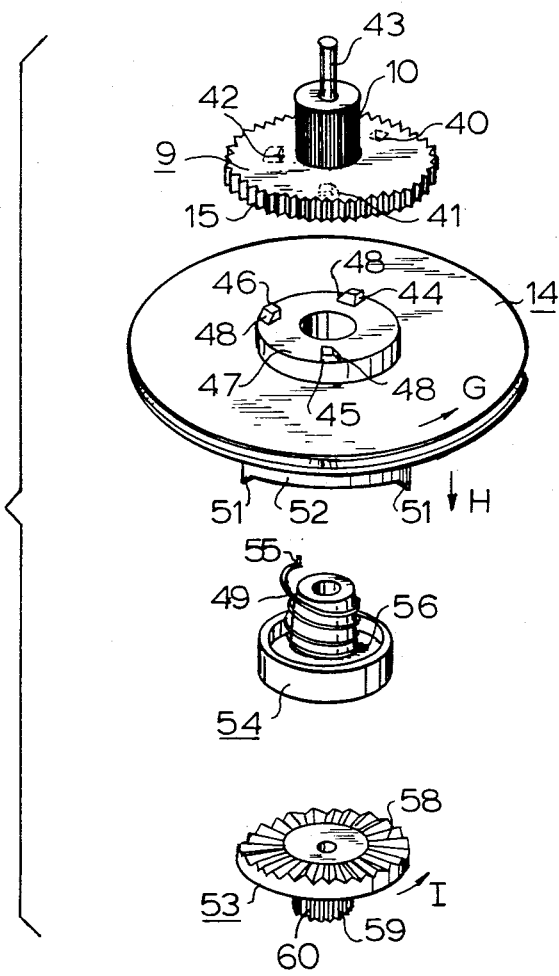
FIG. 8 is an exploded perspective view showing the relationship between the driving gear, the pulley cam, the stopper and the sensing gear.

As shown in FIG. 8 the coil spring 49 is around stop means 54 with one end 55 secured to a portion of the driving gear 9 and the other end 56 is secured to a portion of stop means 54. Spring 49 is loosely inserted in a through hole 57 of the pulley cam 14. Due to the coil spring 49, the pulley cam 14 and the driving gear 9 are pressed upward relative to the Figures.

Figure 15:
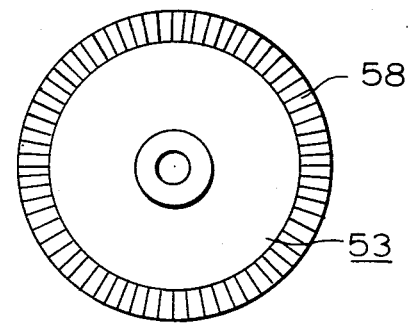
FIG. 15 is a plan view of the sensing gear.
Figure 16:
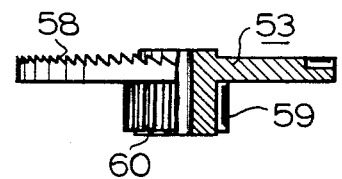
FIG. 16 is an elevational view of the sectional portion of the sensing gear.
Figure 17:
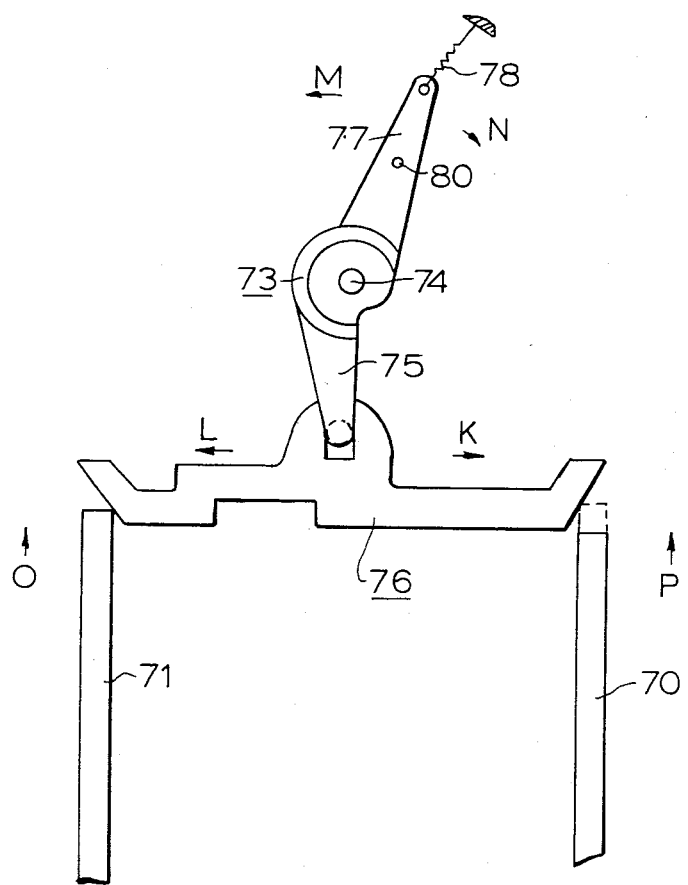
FIG. 17 is a plan view showing the relationship between the switching lever, the right-left movable bar, the fast forward key and the rewind key.

As illustrated in FIGS. 15 and 16, the sensing gear 53 is in a stationary position and separated from the pulley cam 14 when the pulley cam 14 and the driving gear 19 are rotating together. A check gear 58 is provided on the periphery of a flat surface of the sensing gear 53 and is adapted to engage the pawl 51 of the pulley cam 14. A tooth portion 59 of a boss 60 is formed on the sensing gear 53.

Thus, when the driving gear 9 stops rotation, the pulley cam, 14 will be depressed in the direction of arrow H shown in FIG. 8 due to the inner action of the recesses 40, 41 and 42 with the projections 44, 45 and 46 and the coil spring 49 so that the pawl 51 engages the check gear 58 of the sensing gear 53.

Then the sensing gear 53 will be caused to rotate together with the pulley cam 14 in the same direction which is the direction of the arrow I shown in FIG. 8. A locking lever 61 is adapted to turn about a pivot 62 as shown in FIG. 2.

A locking plate 68 for the operating keys of a known type and which will be subsequently described will normally be locked after it has been moved in the direction of arrow S against the bias force of a spring 63 which biases in the direction of an arrow R as shown in FIG. 2.

In this condition, a tooth portion 65 on an arm 64 of the locking lever 61 engages the toothed portion 59 of the sensing gear 53.

An arm 66 which has a locking portion 67 at the forward end is connected to the operating keys locking plate 68 of the known type. The plate 68 carries the conventional key such as a play key 4, a record key 5, a pause key 69, a fast forward key 70, a rewind key 71 and a stop key 72. The operation of the cassette tape recorder is completely stopped by movement of the operating keys locked in plate 68 in the direction of arrow J shown in FIG. 2 which results in automatic shut-off.

In other words, when the sensing gear 53 turns together with the pulley cam 14 in the same direction, the locking lever 61 is caused to turn about the pivot 62 in the direction of arrow G due to the toothed portions 59 and 65 which engage.

Thus, the operating keys locking plate 68 is caused to move in the direction of arrow J by the locking portion 67 to thereby release the locking of the various operating keys which effects automatic stopping of the operation of the cassette tape recorder. In other words, the operating key locking plate 68 is released when stopping of rotation of the winding reel shaft 11 occurs to thereby cause automatic shut-off of the cassette tape recorder.

A switching lever 73 which is loosely inserted in a shaft 74 of the driving gear 9 as shown in FIG. 1 is normally in the neutral position. An arm 75 of the switching lever 73 is connected to a right-left movable bar 76. Movement of the bar 76 in the direction of arrow K or L causes the arm 75 to turn about the shaft 74 in the directibn of arrows M or N. The bar moves toward the arrow K when the rewind key 71 is depressed in the direction of arrow O and moves in the direction of arrow P when the fast forward key 70 is depressed in the direction of arrow P. An arm portion 77 of the switching lever 73 is adapted to be in the neutral position due to the biasing force of coil spring 78. A switching gear 79 is pivotally supported on a pivot shaft 80 on the switching lever 73 for switching between fast forward and rewind operations. A toothed portion 81 of the switching gear 79 is always in engagement with the gear tooth 15 of the driving gear 9 so that the switching gear 79 rotates around the driving gear 9 as well as on its axis. An intermediate gear 82 is normally separated from the switching gear 79 but is in engagement with the gear 84 which is connected to a feed reel shaft 83 also referred to as the rewind reel shaft. The gear 84 integrally formed with the reel shaft 83.

Thus, when the rewind key 71 is depressed in the direction of the arrow 0, the right-left movable bar 76 will be caused to move toward the arrow K and the switching gear 79 will be rotated in the direction of arrow M through the switching lever 73 so as to engage the intermediate gear 82.

The tape feed reel shaft 83 is rotated in the direction of an arrow Q for rewinding the cassette tape and when the cassette tape is completely rewound the tape feed reel shaft 83 is forced to stop rotation. Then the intermediate gear 82 stops rotation as do the switching gear 79 and the driving gear 9. The stopping of rotation of the driving gear 9 causes the pulley cam 14 to be depressed in the direction of the arrow H (See FIG. 8) thereby to move the operating keys locking plate 68 in a predetermined direction which is the direction of arrow J through the sensing gear 53 and the locking lever 61 so that the cassette tape recorder will stop operation automatically. A toothed portion 81 of the switching gear 79 is illustrated.

When the fast forward key 70 is depressed in the direction of the arrow P, the right-left movable bar 76 is caused to move toward the arrow L shown in FIG. 1. Then the swrtching lever 73 turns about the shaft 74 in the direction of the arrow N whereupon the toothed portion 85 of the switching gear 79 engages with the gear tooth 17 of the gear portion 16 on the winding reel shaft 11 so that the winding reel shaft 11 rotates rapidly in the direction of arrow D.

This results in that the winding reel shaft 11 is taking up the cassette tape very rapidly due to the rapid rotation in the direction of arrow D and when all of the tape of the winding reel shaft has been taken up rotation will discontinue. Consequently, the switching gear 79 stops rotation as does the driving gear 9.

As described above, stopping of the rotation of the driving gear 9 causes the pulley cam 14 to be depressed in the direction of arrow H and the operating keys locking plate 68 will be moved toward the arrow J by the sensing gear 53 and the locking lever 61 thereby to automatically stop operation of the cassette tape recorder.

The pinch roller 86, a capstan 87 and a magnetic head 88 are also illustrated.

The various operation modes of the system are as follows:

1. For recording or play operation when the play key 4 or the record key 5 are depressed, the sliding plate 3 is moved toward the arrow A whereupon the idler 8 is inserted between the friction transmission cylinder 10 of the driving gear 9 and the knurled portion 13 on the collar of the winding reel shaft 11.

In this state, as illustrated in FIG. 2, the operating key 4 or 5 will be locked.

Thus, the rotation of the driving gear 9 together with the pulley cam 14 is transmitted to the winding reel shaft 11 through the idler 8 to thereby rotate the winding reel shaft 11 for taking up the cassette tape.

Meanwhile, due to the resilient effect of the coil spring 24 in the direction of the arrow B, the sensing arm 18 urges the silicon oil immersed felt ring 23 to make pressure contact in the recess 26 in gear portion 16 of the reel winding shaft 11 and the felt ring 23 and the sensing arm 18 tend to turn in the direction of the arrow E together with the winding reel shaft 11 which has been already rotated in the direction of the arrow D. However, the locking portion 34 of the sensing arm 18 is pressed against the stop shoulder 39 of the parts assembly 2 to prevent the sensing arm 18 from rotating in the direction of the arrow E.

Upon completion of takeup of the cassette tape, the winding reel 11 will stop rotation. Then sliding friction occurs between the felt ring 23 and the contact surface 26A in the recess 26 of the winding reel shaft 11 under the effect of the bias of the spring 32 to rotate the sensing arm 18 in the direction of arrow C and the viscosity of the silicon oil on the felt ring 23. As a result, the sensing arm 18 turns in the direction of arrow C to cause the pawl 31 of the forward end 30 to engage the gear teeth of the winding reel shaft 11.

Thus, the driving gear 9 stops in rotation in the direction of arrow F.

When the rotation of the driving gear 9 is stopped, the pulley cam 14 is depressed downwardly towards the arrow H due to the interaction of the recesses 40, 41 and 42 projections 44, 45 and 46 and the coil spring 49 to render the pawl 51 in engagement with the check gear 58 of the sensing gear 53.

Then the sensing gear 53 rotates together with the pulley cam 14 in the same direction toward the arrow I. With the rotation of the sensing gear 53 the locking lever 61 is caused to rotate due to the toothed portions 59 and 65 about the pivot 62 in the direction of the arrow G so as to move the operating keys locking plate 68 in the direction of arrow J through the locking portion 67 whereupon the play key 4 or the record key 5 is released from the locked position with the conventional unlocking apparatus so as to automatically shut-off the cassette tape recorder.

In other words, by stopping the rotation of the winding reel shaft 11 the operating keys locking plate 68 is operated to cause automatic shut-off of the cassette tape recorder.

2. For fast rewind or fast forward operation, the rewind key 71 for rewind and the fast forward key 70 for fast forward of the tape are depressed. When the tape feed reel shaft 83 or the winding reel shaft 11 is forced to stop rotation upon completion of winding the tape the driving gear is caused to stop rotation. Then the operating keys locking plate 68 will be caused to move in the direction of arrow J by the pulley cam 14, the sensing gear 53 and the locking lever 61 in the same manner as described above so as to automatically shut-off the cassette tape recorder.

In the invention, the arrangement for stopping of rotation of the winding reel shaft or the tape feed reel shaft is sensed whereupon the tape recorder is automatically shut-off through the associated mechanisms and insures fully automatic shut-off of the cassette tape recorder without damage to the tape which can occur in conventional systems. Thus, relative to FIG. 1, the keys 72, 71, 5, 4, 70 and 69 can be moved upwardly relative to FIG. 1 so as to actuate the tape machine. The driving gear 9 illustrated in FIG. 2 drives the reel shaft 11 through its collar 12, the idler 8 and the friction boss 10 which is connected to the gear 9. As is illustrated in the exploded view of FIG. 8, when the projections 44, 45 and 46 on the pulley cam 14 mate with the depressions 40, 41 and 42 of driving gear 9, they will move togehter. When these projection disengage from the depressions, the driving gear 9 will not be locked to the pulley cam 14.

Although the invention has been described with respect to preferred embodiments, it is not to be so limited as changes and modifications can be made which are within the full intended scope of the invention as defined by the appended claims.

I claim as my invention:

1. Apparatus for automatically shutting off a tape recorder when the tape reaches the end comprising a base plate, feed and winding reel shafts rotatably supported on said base plate for paying out and taking-up magfnetic tape, a driving gear rotatably supported by said base plate and coupled to said winding reel shaft, driving means connected to said driving gear, a sensing mechanism moveable supported on said base plate and adapted to move to a locked position to lock said driving gear when said winding reel shaft is stopped, means for de-energizing said driving means when said driving gear is locked, wherein said winding reel shaft is formed with a collar which has depression and said sensing mechansim has a mating depression and a flexible disc-shaped pad mounted in said depressions between said winding reel shaft and said sensing mechanism, including a liquid lubricant on said flexible disc to lubricate it, including a spring biasing means for spring biasing said winding reel shaft and said sensing mechanism together with said flexible disc-shaped pad between them, including a pulley cam coupled to said driving gear to drive it, a plurality of recesses formed in said driving gear and a plurality of projections formed on said pulley cam for placing them into driven and undriven relationship as they move axially relative to each other, and a stop level forming part of said means for deenergizing said driving means coupled to a locking lever and driven by said pulley cam when said driving gear is stopped, and including a check gear coupled to said pulley cam by a pawl when said pulley cam does not drive said driving gear and said check gear moveable to actuate said stop lever to deenergize said driving means.

2. Apparatus according to claim 1 wherein said lubricant is silicon oil.

3. Apparatus according to claim 1 wherein said lubricant is a viscous aqueous solution.

4. Apparatus according to claim 1 wherein said step lever has a toothed portion for engaging said check gear so that said stop lever is rotated by said check gear to cause said driving means to be shut off.

5. Apparatus according to claim 4 including second spring biasing means biasing said pulley cam toward said driving gear.

* * * * *